(12) United States Patent
Jepperson et al.

(10) Patent No.: US 11,916,863 B1
(45) Date of Patent: Feb. 27, 2024

(54) ANNOTATION OF UNANSWERED MESSAGES

(71) Applicant: International Business Machines Corporation, Armonk, NY (US)

(72) Inventors: Jacob Ryan Jepperson, St. Paul, MN (US); Zachary A. Silverstein, Georgetown, TX (US); Melanie Dauber, Oceanside, NY (US); Logan Bailey, Atlanta, GA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/154,324

(22) Filed: Jan. 13, 2023

(51) Int. Cl.
*G06F 15/16* (2006.01)
*H04L 12/18* (2006.01)
*H04L 51/224* (2022.01)

(52) U.S. Cl.
CPC ........ *H04L 51/224* (2022.05); *H04L 12/1818* (2013.01)

(58) Field of Classification Search
None
See application file for complete search history.

(56) References Cited

U.S. PATENT DOCUMENTS

| | | | | |
|---|---|---|---|---|
| 5,995,943 | A * | 11/1999 | Bull | G06Q 10/02 709/217 |
| 8,239,413 | B2 * | 8/2012 | Hubert | G06Q 30/0601 707/791 |
| 8,655,954 | B2 | 2/2014 | Leedberg | |
| 9,274,858 | B2 | 3/2016 | Milliron | |
| 9,501,467 | B2 * | 11/2016 | Light | G06F 40/30 |
| 10,152,534 | B2 | 12/2018 | Bastide | |
| 11,715,473 | B2 * | 8/2023 | Rodriguez | G06F 3/04847 705/14.4 |
| 2005/0060643 | A1 * | 3/2005 | Glass | H04L 51/212 715/205 |
| 2007/0011155 | A1 * | 1/2007 | Sarkar | G06F 16/38 707/999.005 |
| 2010/0223261 | A1 * | 9/2010 | Sarkar | G06Q 30/02 707/726 |
| 2018/0075147 | A1 * | 3/2018 | Bagheri | G06Q 30/0269 |
| 2019/0138647 | A1 * | 5/2019 | Kumar | G06N 20/00 |
| 2020/0160458 | A1 | 5/2020 | Bodin | |
| 2020/0202388 | A1 | 6/2020 | Raviv | |
| 2020/0272791 | A1 * | 8/2020 | Jonnalagadda | G06N 5/04 |
| 2022/0199079 | A1 * | 6/2022 | Hanson | H04L 51/02 |

OTHER PUBLICATIONS

Author Unknown, "B2B collaboration solutions", IBM, https://www.ibm.com/supply-chain/collaboration , Accessed Jan. 11, 2023, pp. 1-11.

(Continued)

*Primary Examiner* — Phuoc H Nguyen
(74) *Attorney, Agent, or Firm* — Edward J. Wixted, III

(57) ABSTRACT

In an approach, a processor monitors messaging data between a plurality of users from a first collaboration application. A processor identifies an unanswered message within the first messaging data. A processor, subsequent to identifying the unanswered message, identifies that the plurality of users attends a collaborative session. A processor captures a second messaging data of the collaborative session. A processor determines that the second messaging data contains subject matter that meets a threshold of similarity to the unanswered message. A processor annotates the unanswered message.

20 Claims, 4 Drawing Sheets

(56) References Cited

OTHER PUBLICATIONS

Author Unknown, "Workplace collaboration services", IBM, https://web.archive.org/web/20211026064153/https:/www.ibm.com/serv . . . , Accessed Jan. 12, 2023, pp. 1-5.

Disclosed Anonymously, "Classifying, Grouping, and Hooking Untagged Answers to the Most Probable Question and Thread Using K-NN Modelling," An ip.com Prior Art Database Technical Disclosure, https://ip.com/IPCOM/000268795, ip.com No. IPCOM000268795D, ip.com Electronic Publication Date: Feb. 28, 2022, 5 pages.

Hawk, et. al., "Slack: Improve team communication and efficiency", IBM Garage Practices, https://www.ibm.com/garage/method/practices/culture/tool_slack/, Accessed Jan. 11, 2023, pp. 1-7.

Iyer et al., "Improving Interaction by Inviting a Contextual Information Assistant Program for Collaboration," An ip.com Prior Art Database Technical Disclosure, Original Publication Date: Aug. 27, 2007, ip.com No. IPCOM000157369D, ip.com Electronic Publication Date: Aug. 27, 2007, 4 pages.

Kim, Jihie, et al., "Towards Identifying Unresolved Discussions in Student Online Forums," Proceedings of the NAACHL HLT 2010 Firth Workshop on Innovative Use of NLP for Building Educational Applications, Association for Computational Linguistics, pp. 84-91, Jun. 2010.

Patel, et. al., "Get started with remote collaboration", IBM Garage Practices, https://www.ibm.com/garage/method/practices/culture/remote-collaboration/, Accessed Jan. 11, 2023, pp. 1-10.

Shi et al., "ISPY: Automatic Issue-Solution Pair Extraction from Community Live Chats," Proceedings of the 2021 36th IEEE/ACM International Conference on Automated Software Engineering (ASE), Melbourne, Australia, Nov. 15-19, 2021, 13 pages.

\* cited by examiner

ANNOTATION OF UNANSWERED MESSAGES

BACKGROUND

The present invention relates to online collaboration tools and more specifically, to tracking responses to unanswered messages.

Collaborative software or groupware is application software designed to help people working on a common task to attain their goals. As regards available interaction, collaborative software may be divided into real-time collaborative editing platforms that allow multiple users to engage in live, simultaneous and reversible editing of a single file (usually a document), and version control. Collaboration in technology encompasses a broad range of tools that enable groups of people to work together including social networking, instant messaging, team spaces, web sharing, audio conferencing, video, and telephony. Enterprise collaboration tools focus on encouraging collective intelligence and staff collaboration at the organization level, or with partners. These include features such as staff networking, expert recommendations, information sharing, expertise location, peer feedback, and real-time collaboration. this enables employees to enhance social awareness and their profiles. Collaboration interaction encompasses both asynchronous and synchronous methods of communication and serves as an umbrella term for a wide variety of software packages. Perhaps the most associated form of synchronous collaboration is web conferencing, but the term can also encompass, for example, Internet Protocol (IP) telephony, instant messaging, and rich video interaction with telepresence.

SUMMARY

According to some embodiments of the present invention, a computer-implemented method, computer program product, and computer system are provided. A processor monitors messaging data between a plurality of users from a first collaboration application. A processor identifies an unanswered message within the first messaging data. A processor, subsequent to identifying the unanswered message, identifies that the plurality of users attends a collaborative session. A processor captures a second messaging data of the collaborative session. A processor determines that the second messaging data contains subject matter that meets a threshold of similarity to the unanswered message. A processor annotates the unanswered message.

DETAILED DESCRIPTION

Embodiments of the present invention recognize that when using messaging applications (i.e., Slack®, WebEx®, Email, etc.) there are times when questions asked by one user will go unanswered. This lack of response may be due to a time restraint, a requirement for further clarification, or numerous other reasons. Embodiments of the present invention recognize that it can be quite troubling for a user to go through their messages and discover a question that was never answered or, essentially, left unread. However, in some instances, the question may have been answered in a separate medium (e.g., a conference call). Embodiments of the present invention describe an approach to track collaboration applications for unanswered messages, store said messages, collect answers to said messages discussed in different communications or communication applications, and annotate the original unanswered messages with, for example, the appropriate answer or contextual information about where the answer may be located.

The present invention will now be described in detail with reference to the Figures.

Figure 1:
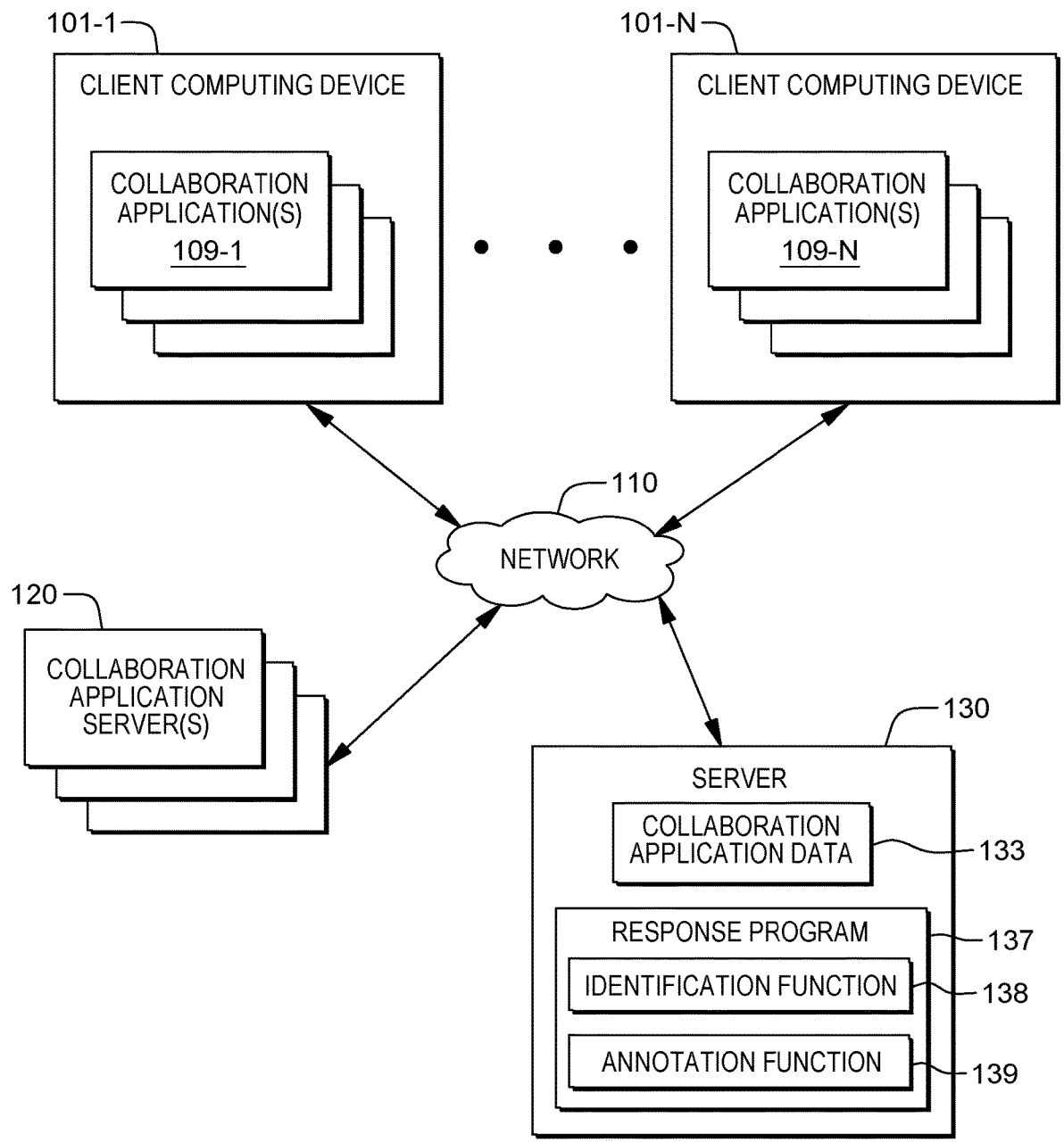
FIG. 1 depicts a diagram of a computing environment, in accordance with one embodiment of the present invention.

FIG. 1 is a functional block of a computing environment 100, in accordance with one embodiment of the present invention. FIG. 1 provides only an illustration of one embodiment and does not imply any limitations with regard to the environments in which different embodiments may be implemented.

As used herein, a reference number, such as client computing device 101 may refer to a single client computing device 101 (e.g., client computing device 101-1 or client computing device 101-N) or multiple instances of the associated object (e.g., client computing device 101-1, client computing device 101-2 (not shown), and client computing device 101-N).

In the depicted embodiment, computing environment 100 includes client computing devices 101, collaboration application server(s) 120, and server 130 interconnected over network 110. Network 110 may be a local area network (LAN), a wire area network (WAN) such as the Internet, the public switched telephone network (PSTN), a Bluetooth® connection, any combination thereof, or any combination of connections and protocols that will support communications between client computing device 101, collaboration application server(s) 120, server 130 and, in some embodiments, other servers or computing devices (not shown), in accordance with embodiments of the invention. Client computing device 101 represents the various embodiments of computing devices that may be used in the invention. Network 110 may include wired, wireless, or fiber optic connections. Computing environment 100 may include additional servers, computing devices, mobile devices, or other devices not shown.

Client computing devices 101 may each be a computing device and in general, client computing devices 101 may be any electronic device or computing system capable of receiving and sending data and communicating with server 130 and collaboration application server(s) 120 via network 110. In some embodiments, client computing devices 101 may be capable of communicating with other servers (not shown). In the depicted embodiment, client computing devices 101 includes at least one collaboration application(s) 109.

In the depicted embodiment, collaboration application 109 is a web-based application that allows users to share data, messages, documents, etc. Examples of collaboration application(s) 109 are Slack®, Microsoft Teams®, Zoom®, Gmail®, Outlook®, Skype®, Webex®, and any other application that allows users to share information and send messages with one another. Users may opt into the use of response program 137. Once a user opts in, selected collaboration applications 109 across client computing device 101 will be connected with one another. So, if a user decides that they would only want their Email and Slack® to be connected via response program 137, then the user would select those specific collaboration applications 109 and this will restrict all other collaboration applications 109 from being monitored and annotated. The user may also have the ability to change this setting whenever necessary.

It should be noted that, upon storing device information capable of identifying a user, the user is able to adjust privacy settings, opt in, or opt out to any types of sharing of their identifying data that is described herein. Further, even in embodiments where information is sent to server 130, device information may be the only sent information, resulting in security anonymity with respect to the identity of the actual user.

Collaboration application server(s) 120 may be a management server, a web server, or any other electronic device or computing system capable of receiving and sending data and communicating with collaboration application(s) 109 via network 110. Collaboration application server(s) 120 may host collaboration platforms (e.g., any of the collaboration applications 109 described above). In general, collaboration application server(s) 120 may each be associated with a particular collaboration application 109 and may store, for example, messaging or other communication data by users of the collaboration application 109. For example, when using an email client, a user's emails may be stored on servers owned, operated, and/or managed by the email provider itself. In some embodiments, a client device may perform functions of collaboration application server(s) 120, such as client computing devices 101. In other embodiments, collaboration application server(s) 120 may represent a server computing system utilizing multiple computers as a server system, such as in a cloud computing environment.

Server 130 may be a management server, a web server, or any other electronic device or computing system capable of receiving and sending data and communicating with client computing devices 101 via network 110. In some embodiments, functions of server 130 may be performed by a client device, such as client computing devices 101. In other embodiments, server 130 may represent a server computing system utilizing multiple computers as a server system, such as in a cloud computing environment. Server 130 contains collaboration application data 133, response program 137, identification function 138, and annotation function 139.

In some embodiments, collaboration application data 133 may be any captured topics or messages that were identified by response program 137. Some of this data may include unanswered messages identified by identification function 138, written conversations between users, and converted text of oral communication between users via natural language processing (NLP). These types of collaboration application data 133 and others not listed may be used in cooperation with one another, or on an individual basis, dependent on the embodiment.

Response program 137 operates to identify and annotate unanswered messages that come from one or more users in a collaboration application. Response program 137 operates to monitor collaboration application data 133 for messages that have not received a response from a user. In the depicted embodiment, response program 137 includes identification function 138 and annotation function 139.

Identification function 138 operates to monitor, identify and store unanswered messages within a collaboration application by the collaboration application data 133. In some embodiments, the data is collected directly from the client computing devices 101. Collaboration application data 133 is monitored for messages that have been asked by a user but have not received a response from another user. In some embodiments, the collaboration application data 133 is collected from collaboration application server(s) 120.

In some embodiments, identification function 138 is a function of response program 137 operating on client computing device 101. In other embodiments, identification function 138 may be a separate program and is not a function of response program 137. In the depicted embodiment, identification function 138 is a function of response program 137 operating on server 130 that collects and stores collaboration application data 133.

Annotation function 139 operates to annotate an unanswered message that was identified by identification function 138. Additionally, annotation function 139 identifies appropriate subject matter between several users that may be used to answer the unanswered message. In some embodiments, annotation function 139 operates on server 130. However, in other embodiments, annotation function 139 can operate on collaboration application server(s) 120, client computing device 101, or other computing devices not shown provided annotation function has access to any collaboration application 109 and storage on said computing device and is accessible to any program that might need to access its functionality.

In the depicted embodiment, the annotation function 139 and identification function 138 work in conjunction with one another as functions of response program 137 on server 130. In other embodiments, response program 137 can be performed on separate devices or servers. For example, if identification function 138 is run on collaboration application server(s) 120, the data from the collaboration application server(s) 120 may be sent to collaboration application data 133 of server 130. From that point, annotation function 139 may perform tasks using the data collected. In other embodiments, identification function 138 may be performed on server 130, and the data may be sent back to client computing device 101 where annotation function 139 may be function operate to annotate an identified unanswered message with corresponding subject matter. In further embodiments, identification function 138 or annotation function 139 may operate on collaboration application server(s) 120, and the data could be sent to either server 130 or client computing devices 101.

In a separate embodiment, response program 137 may operate on client computing device 101 as opposed to operating in a separate server.

Figure 2:
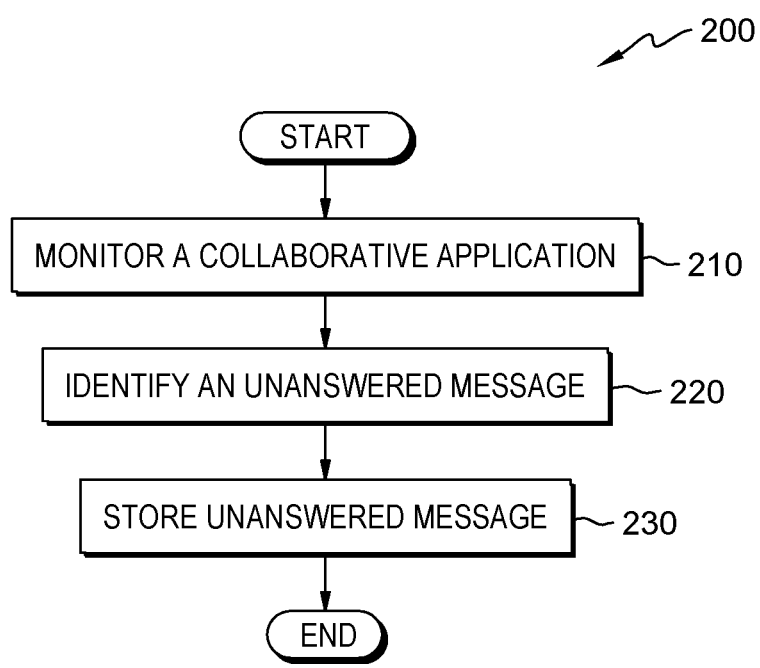
FIG. 2 depicts a flowchart of the steps of an identification function of a response program executing within the computing environment of FIG. 1, for finding and storing unanswered messages, in accordance with an embodiment of the present invention.

FIG. 2 depicts steps of a flowchart 200 of identification function 138, of response program 137, executing within the computing environment of FIG. 1, for finding and storing unanswered messages, in accordance with an embodiment of the present invention.

In step 210, in some embodiments, identification function 138 monitors a collaboration application. More particularly, identification function 138 monitors collaboration application 109 within a client computing device 101. After a first user and second user opt into the response program 137, a conversation between both users is monitored. Identification function 138 monitors the conversation and tracks any messages and answers that a user gives and receives. In some embodiments, the conversation will be monitored between two or more users. If only a first user opts into response program 137, but a second user fails to do so, identification function 138 may track all the messages that are sent by the first user. The second user may have to opt in before their messages are tracked and stored. In some embodiments, identification function 138 monitors the conversation in real-time. In other embodiments, identification function 138 monitors a conversation after its completion.

In step 220, in some embodiments, identification function 138 identifies an unanswered message within the received collaboration application data 133. After monitoring the conversation between two or more users, identification function 138 accesses collaboration application data 133 and then identifies and marks a message as "unanswered". Identification function 138 utilizes Natural Language Processing (NLP) to identify keywords and phrases from the unstructured text of the collaboration applications 109. This form of linguistic processing allows identification function 138 to determine when a first user makes an inquiry, and a second user fails to give a response to that inquiry. The identification of the unanswered message may have variable conditions that can be changed by the user. For example, the required length of time before the message can be identified as "unanswered" could be the only qualifying condition. More specifically, three days can pass without an answer to a message present, and therefore, identification function 138 would mark the message as "unanswered" and identification function 138 would store an unanswered message inside collaboration application data 133 (see step 230). In another example, a certain number of messages between two users could pass before the message can be identified as "unanswered". More specifically, ten messages between two users could pass without the answer to a message present, and therefore, identification function 138 would mark the message as "unanswered" and identification function 138 would store an unanswered message inside collaboration application data 133 (see step 230). These are some embodiments with some qualifying conditions; however, other qualifying conditions may be used. These qualifying conditions could be used individually or in any combination depending on specified user preferences.

It should be noted that, an unanswered message may be any type of communication within collaboration application 109 that can later be accessed and annotated. In one embodiment, the unanswered message is a text message within collaboration application 109. In other embodiments, an unanswered message may be an invitation or a message asked verbally within collaboration application 109. Identification function 138 monitors any collaboration application 109 that has some form of communication between users (see step 210) and can therefore identify and mark different types of messages. For example, if a first user, sends a meeting invite to a second user, and the second user never accepts or rejects the invite, then that invite can be identified as "unanswered". The original "unanswered" calendar invite may later be annotated with the response from the second user.

In step 230, in some embodiments, identification function 138 stores an unanswered message within the collaboration application data 133. In one embodiment, collaboration application data 133 serves as a storage repository where data including the identified unanswered messages may be stored. After identification function identifies and marks a message as "unanswered" (see step 220), identification function 138 captures and stores the message within collaboration application data 133. The stored message may subsequently be accessed by, for example, annotation function 139. In some embodiments, the unanswered message is stored to server 130. In other embodiments, the unanswered message is stored to client computing device 101 or computing application server(s) 120.

Figure 3:
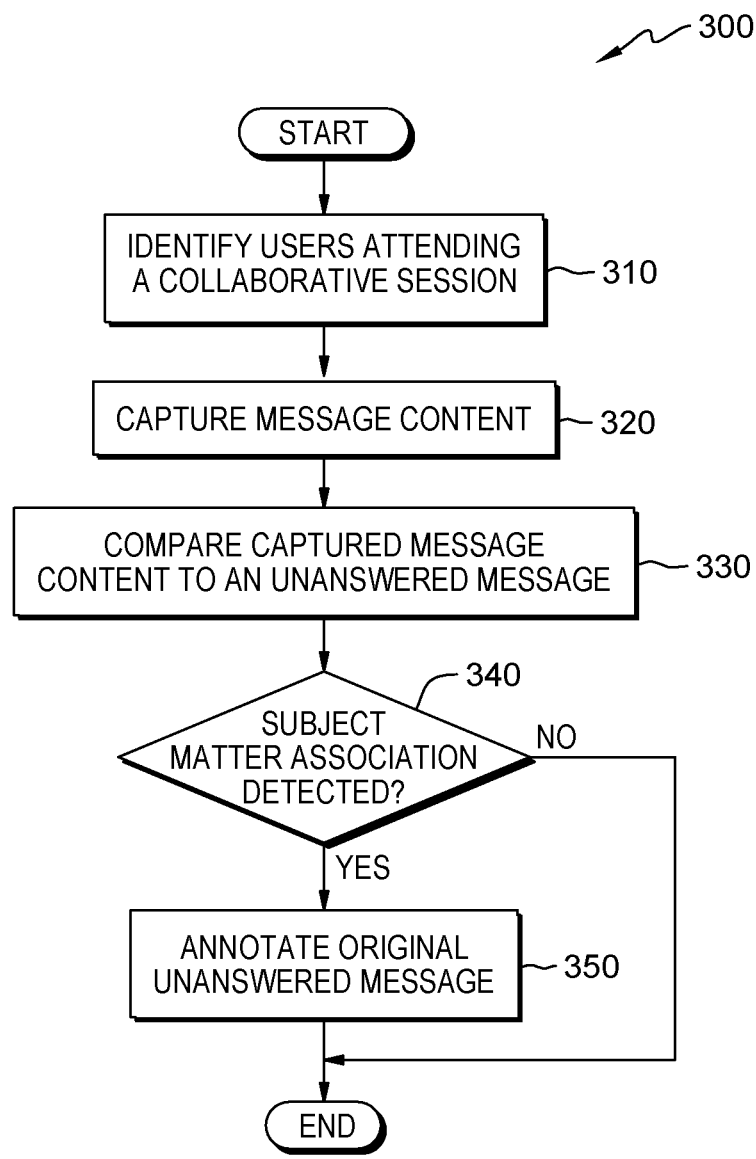
FIG. 3 depicts a flowchart of the steps of an annotation function of a response program executing within the computing environment of FIG. 1, for annotating an unanswered message after a subsequent communication, in accordance with an embodiment of the present invention.

FIG. 3 depicts steps of flowchart 300 of an annotation function 139, of response program 137, executing within the computing environment 100 of FIG. 1, for annotating an unanswered message, in accordance with an embodiment of the present invention.

In step 310, in some embodiments, annotation function 139 identifies when identifies when users corresponding to an unanswered question attend a collaborative session with one another. Annotation function 139 uses the unanswered messages inside collaboration application data 133 collected by the identification function 138. If there is an unanswered message identified by identification function 138, annotation function 139 identifies when the same users are attending a collaborative session on any collaboration application 109. After a user has opted into response program 137, their messages may be monitored and stored. By opting into response program 137, the accounts across selected collaboration applications 109 are thereby linked. From linking the accounts, annotation function 139 verifies that the identity of a user is the same. For example, if a user has allowed the collaborative applications, Slack® and WebEx®, to be accessed by response program 137, then their accounts on both applications will be linked via the program. As long as corresponding users have granted access to the same collaboration applications 109, annotation function 139 may identify when these users attend a collaborative session with one another. (User A and User B attend a WebEx® meeting. Both User A and User B have allowed WebEx® to be accessed by response program 137. Annotation function 139 identifies that both User A and User B are together on a WebEx® meeting.) The collaborative session may take place either on the same collaboration application 109 from where the unanswered message was first identified or a different collaboration application 109 from where the unanswered message was first identified.

In step 320, in some embodiments, annotation function 139 captures message content from identified collaborative session. In this step, annotation function 139 captures the message content from identified collaborative session that users attend with one another (see step 310). This message content is captured and stored within collaboration application data 133. In some embodiments, this captured message content is stored within collaboration application server 120. In other embodiments, this message content is stored within client computing device 101. In one embodiment, annotation function 139 utilizes speech-to-text technology to capture text for collaboration applications 109 that use audio and/or video conferencing (Zoom®, WebEx®, Google Meet®, etc.). This converted text may also be stored within the collaboration application data 133. In some embodiments, annotation function 139 may capture the specific user along with their written/transcribed text. For example, if Logan (first user) and Zach (second user) are in a video conference with one another, all of Logan's transcribed text may be stored under Logan's name, and all of Zach's transcribed text may be stored under Zach's name.

In step 330, in some embodiments, annotation function 139 compares the stored unanswered message to the captured text within the collaboration application data 133. Annotation function 139 accesses the unanswered message that was identified by identification function 138 and compares the unanswered message to the text that was captured (see step 320). In some embodiments, annotation function 139 utilizes cosine similarity within NLP technology to determine if there is associated subject matter within the captured text that answers the identified unanswered message. Cosine similarity is one of the metrics to measure the text-similarity between two documents irrespective of their size in Natural language Processing. A word is represented into a vector form. The text documents are represented in n-dimensional vector space. In this context, the two vectors refer to the messages shared within the collaboration platform application(s) 109. Annotation function 139 searches for relevant subject matter among the captured text that could be used to annotate the original message. For example, in the identified unanswered message, Logan asks Zach "Where is the RPA logfiles?". When Zach talks to Logan on a subsequent conference call, subject matter around RPA log files is discussed and annotation function 139 recognizes that the discussed subject matter is relevant to the unanswered message. Annotation function 139 may also search for keywords in the text that closely relate to the unanswered message. For example, when Zach talks to Logan on a subsequent conference call, Zach may say the words, "log" or "files", and annotation function 139 recognizes these keywords as important to the identified unanswered message. Annotation function 139 may also utilize context analysis when determining phrases that indicate a potential answer. Contextual analysis in NLP invoves within. For example, annotation function 139 may identify when Zach says to Logan "Oh by the way in response to what you asked me earlier . . ." as an indication that whatever follows the "earlier" is relevant subject matter. Further, it should be noted that annotation function 139, in some embodiments, may not find an exact answer to the unanswered message, but may determine important information that relates to the message.

In decision 340, annotation function 139 determines if the captured text contains subject matter that may answer the unanswered message identified by identification function 138. Annotation function 139 makes this decision based on the comparison of the captured message content to the identified unanswered message (see step 330). If annotation function 139 determines that the captured text contains relevant subject matter when compared to the unanswered message (decision 340, yes branch), the function annotates the unanswered message in the original collaboration application 109 with the relevant captured message content (step 350). The annotation may be a form of notification that lets a user know that the original message has been answered. (e.g., Outlook® email, or Slack® message) The annotation may also be a text insertion of the relevant subject matter under the original unanswered message. The annotation may include information that relates to the subsequent collaborative session (meeting date, time, attendees) or any other substantive information relating to the meeting such as, for example, extracted text comprising the conversation of the meeting or a summary of the conversation that occurred during the meeting. The annotation may also include a link to the original unanswered message. The implementation of the annotation may come about as an add-on of a particular collaboration application 109. If annotation function 139 determines that the captured text does not contain relevant subject matter when compared to the unanswered message (decision 340, no branch) the function is complete. In some embodiments, after a predetermined amount of time has passed without an answer to the unanswered message, the annotation function 139 may annotate the original message to notify the first user that an answer was never received.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
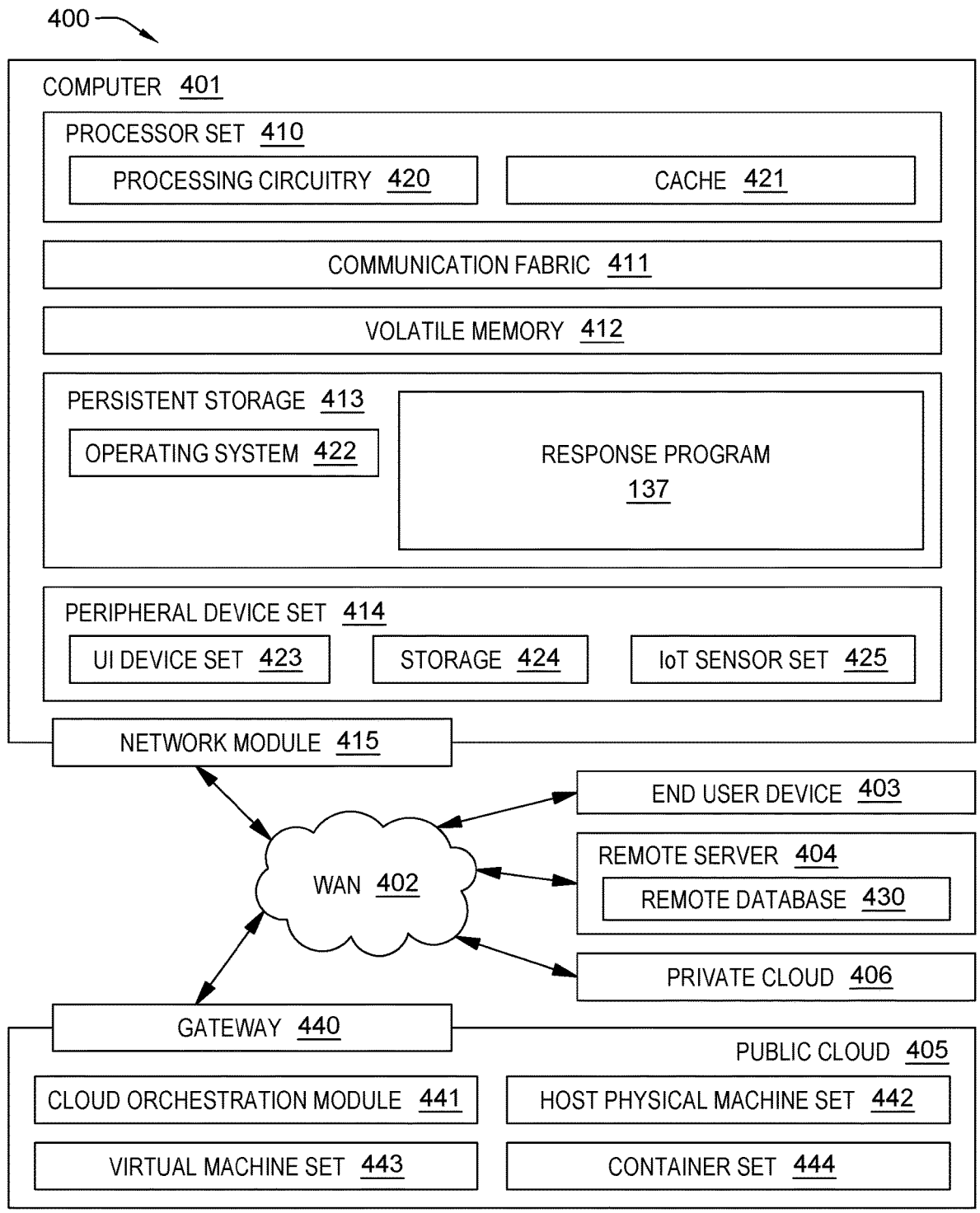
FIG. 4 is a block diagram of components of the client computing devices, collaboration application server(s), and server of FIG. 1, in accordance with an embodiment of the present invention.

FIG. 4 depicts computing environment 400 that includes, at least, a block diagram of components of client computing devices 101, collaboration application server(s) 120, and/or server 130 of FIG. 1, in accordance with an embodiment of the present invention.

Computing environment 400 contains an example of an environment for the execution of at least some of the computer code involved in performing the inventive methods, such as response program 137. In addition to block 137, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 137, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 137 in persistent storage 413.

COMMUNICATION FABRIC 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface type operating systems that employ a kernel. The code included in block 137 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments.

Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
monitoring, by one or more processors, first messaging data between a first user and a second user, wherein the first user and the second user are generating the first messaging data within a first collaboration application;
identifying, by one or more processors, an unanswered message within the first messaging data;
subsequent to identifying the unanswered message, identifying, by one or more processors, that the first user and the second user are both attending a collaborative session using a second collaboration application, wherein the second collaboration application is different than the first collaboration application;
capturing, by one or more processors, second messaging data generated in the collaborative session;
determining, by one or more processors, that the second messaging data contains subject matter that meets a threshold of similarity to the unanswered message based on natural language processing of the second messaging data; and responsive to determining that the second messaging data contains subject matter that meets the threshold of similarity to the unanswered message, annotating, by one or more processors, the unanswered message with a text insertion of the second messaging data adjacent to the unanswered message within the first messaging data and meeting information for the collaborative session.

2. The computer-implemented method of claim 1, further comprising:

determining, by one or more processors, a keyword from the unanswered message using cosine similarity.

3. The computer-implemented method of claim 1, wherein the unanswered message comprises a question that has remained unanswered after a set amount of time has passed.

4. The computer-implemented method of claim 1, wherein the unanswered message comprises a question that has remained unanswered after a set amount of messages between the first user and the second user has passed.

5. The computer-implemented method of claim 1, wherein determining that the second messaging data contains the subject matter that meets the threshold of similarity to the unanswered message utilizes contextual analysis and keyword identification.

6. The computer-implemented method of claim 1, wherein the annotation of the unanswered message further comprises a summary of a conversation between the first user and the second user during the collaborative session.

7. The computer-implemented method of claim 1, further comprising:

determining, by one or more processors, that an account of the first user for the first collaboration application is linked to a corresponding account of the first user for the second collaboration application.

8. The computer-implemented method of claim 1, wherein annotating the unanswered message further comprises generating a notification by the first collaboration application.

9. The computer-implemented method of claim 1, wherein the annotation further comprises extracted text of conversation of the collaborative session.

10. A computer program product comprising:

one or more computer readable storage media, wherein the one or more computer readable storage media are not transitory signals per se, and program instructions collectively stored on the one or more computer readable storage media, the program instructions comprising:

program instructions to monitor first messaging data between a first user and a second user, wherein the first user and the second user are generating the first messaging data within a first collaboration application;

program instructions to identify an unanswered message within the first messaging data;

program instructions to, subsequent to identifying the unanswered message, identify that the first user and the second user are both attending a collaborative session using a second collaboration application, wherein the second collaboration application is different than the first collaboration application;

program instructions to capture second messaging data generated in the collaborative session;

program instructions to determine that the second messaging data contains subject matter that meets a threshold of similarity to the unanswered message based on natural language processing of the second messaging data; and program instructions to, responsive to determining that the second messaging data contains subject matter that meets the threshold of similarity to the unanswered message, annotate the unanswered message with a text insertion of the second messaging data adjacent to the unanswered message within the first messaging data and meeting information for the collaborative session.

11. The computer program product of claim 10, further comprising:

program instructions, collectively stored on the one or more computer readable storage media, to determine a keyword from the unanswered message using cosine similarity.

12. The computer program product of claim 10, wherein the unanswered message comprises a question that has remained unanswered after a set amount of time has passed.

13. The computer program product of claim 10, wherein the unanswered message comprises a question that has remained unanswered after a set amount of messages between the first user and the second user has have passed.

14. The computer program product of claim 10, wherein the program instructions to determine that the second messaging data contains the subject matter that meets the threshold of similarity to the unanswered message utilize contextual analysis and keyword identification.

15. The computer program product of claim 10, wherein the annotation of the unanswered message further comprises a summary of a conversation between the first user and the second user during the collaborative session.

16. A computer system comprising:

one or more computer processors, one or more computer readable storage media, and program instructions collectively stored on the one or more computer readable storage media for execution by at least one of the one or more computer processors, the program instructions comprising:

program instructions to monitor first messaging data between a first user and a second user, wherein the first user and the second user are generating the first messaging data within a first collaboration application;

program instructions to identify an unanswered message within the first messaging data;

program instructions to, subsequent to identifying the unanswered message, identify that the first user and the second user are both attending a collaborative session using a second collaboration application, wherein the second collaboration application is different than the first collaboration application;

program instructions to capture second messaging data generated in the collaborative session;

program instructions to determine that the second messaging data contains subject matter that meets a threshold of similarity to the unanswered message based on natural language processing of the second messaging data; and program instructions to, responsive to determining that the second messaging data contains subject matter that meets the threshold of similarity to the unanswered message, annotate the unanswered message with a text insertion of the second messaging data adjacent to the unanswered message within the first messaging data and meeting information for the collaborative session.

17. The computer system of claim 16, further comprising:
program instructions, collectively stored on the one or more computer readable storage media for execution by at least one of the one or more computer processors, to determine a keyword from the unanswered message using cosine similarity.

18. The computer system of claim 16, wherein the unanswered message comprises a question that has remained unanswered after a set amount of time has passed.

19. The computer system of claim 16, wherein the unanswered message comprises a question that has remained unanswered after a set amount of messages between the first user and the second user has passed.

20. The computer system of claim 16, wherein the program instructions to determine that the second messaging data contains the subject matter that meets the threshold of similarity to the unanswered message utilize contextual analysis and keyword identification.

* * * * *